(12) United States Patent
Lim et al.

(10) Patent No.: US 11,137,650 B2
(45) Date of Patent: Oct. 5, 2021

(54) METHOD FOR DRIVING OPTICAL ELEMENT

(71) Applicant: LG Chem, Ltd., Seoul (KR)

(72) Inventors: Eun Jung Lim, Daejeon (KR); Dong Hyun Oh, Daejeon (KR); Jung Sun You, Daejeon (KR); Jin Hong Kim, Daejeon (KR); Hyun Jun Lee, Daejeon (KR); Nam Hun Kim, Daejeon (KR); Min Jun Gim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/643,947

(22) PCT Filed: Sep. 27, 2018

(86) PCT No.: PCT/KR2018/011367
§ 371 (c)(1),
(2) Date: Mar. 3, 2020

(87) PCT Pub. No.: WO2019/066456
PCT Pub. Date: Apr. 4, 2019

(65) Prior Publication Data
US 2020/0201094 A1 Jun. 25, 2020

(30) Foreign Application Priority Data
Sep. 29, 2017 (KR) ........................ 10-2017-0127823

(51) Int. Cl.
*G02F 1/1347* (2006.01)
*G02F 1/1337* (2006.01)
(Continued)

(52) U.S. Cl.
CPC ............ *G02F 1/1347* (2013.01); *G02F 1/135* (2013.01); *G02F 1/1337* (2013.01); *G02F 1/134309* (2013.01)

(58) Field of Classification Search
CPC ................. G02F 1/1347; G02F 1/1337; G02F 1/134309; G02F 1/135
(Continued)

(56) References Cited

U.S. PATENT DOCUMENTS

2002/0079847 A1 6/2002 Yanagida et al.
2002/0149728 A1 10/2002 Ogishima et al.
(Continued)

FOREIGN PATENT DOCUMENTS

| JP | H09197429 A | 7/1997 |
| JP | 2001142047 A | 5/2001 |

(Continued)

OTHER PUBLICATIONS

Extended European Search Report with Written Opinion for Application No. 18863485.1 dated Jul. 10, 2020, 7 pages.
(Continued)

*Primary Examiner* — Charles S Chang
(74) *Attorney, Agent, or Firm* — Lerner, David, Littenberg, Krumholz & Mentlik, LLP

(57) ABSTRACT

The present application relates to an optical element, a driving method of the optical element, a transmittance-variable device and a use thereof. In one example, the present application may provide a driving method suppressing a back-flow phenomenon caused by a bulk liquid crystal compound even when a cell gap of a liquid crystal layer becomes thick. The driving method may ensure excellent response speeds and driving characteristics.

17 Claims, 8 Drawing Sheets

(51) Int. Cl.
*G02F 1/1343* (2006.01)
*G02F 1/135* (2006.01)

(58) Field of Classification Search
USPC .................................................... 349/11, 13
See application file for complete search history.

(56) References Cited

U.S. PATENT DOCUMENTS

| | | |
|---|---|---|
| 2004/0119924 A1 | 6/2004 | Takeda et al. |
| 2013/0135543 A1* | 5/2013 | Kaifu ................. G02F 1/13306 349/33 |
| 2015/0015818 A1 | 1/2015 | Kim et al. |
| 2016/0070132 A1 | 3/2016 | Soto et al. |
| 2016/0314624 A1 | 10/2016 | Li et al. |
| 2018/0204532 A1* | 7/2018 | Kobayashi ........... G02B 27/017 |
| 2018/0373068 A1 | 12/2018 | Lim et al. |

FOREIGN PATENT DOCUMENTS

| | | |
|---|---|---|
| KR | 100286590 B1 | 3/2001 |
| KR | 100343426 B1 | 10/2003 |
| KR | 20050014245 A | 2/2005 |
| KR | 100800238 B1 | 2/2008 |
| KR | 20150007804 A | 1/2015 |
| KR | 20160117344 A | 10/2016 |

OTHER PUBLICATIONS

International Search Report for PCT/KR2018/011367 dated Jan. 2, 2019.

* cited by examiner

[Figure 1]
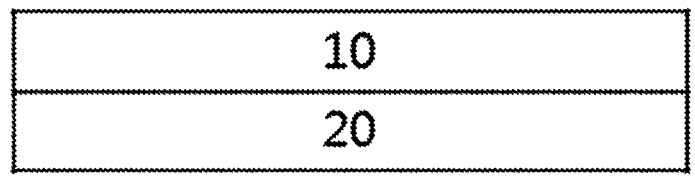
[Figure 2]
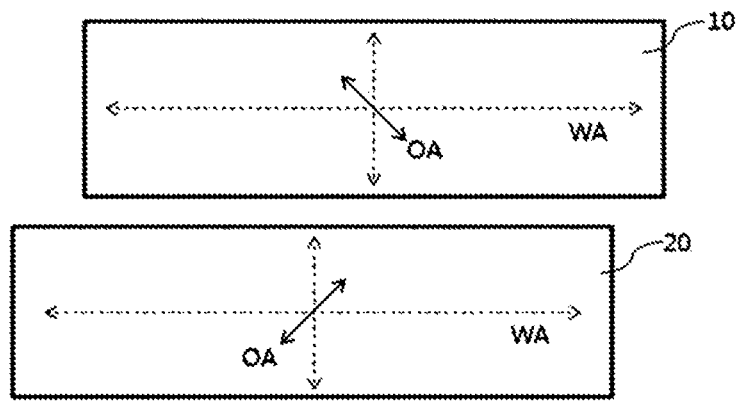

[Figure 3]
[Figure 4]
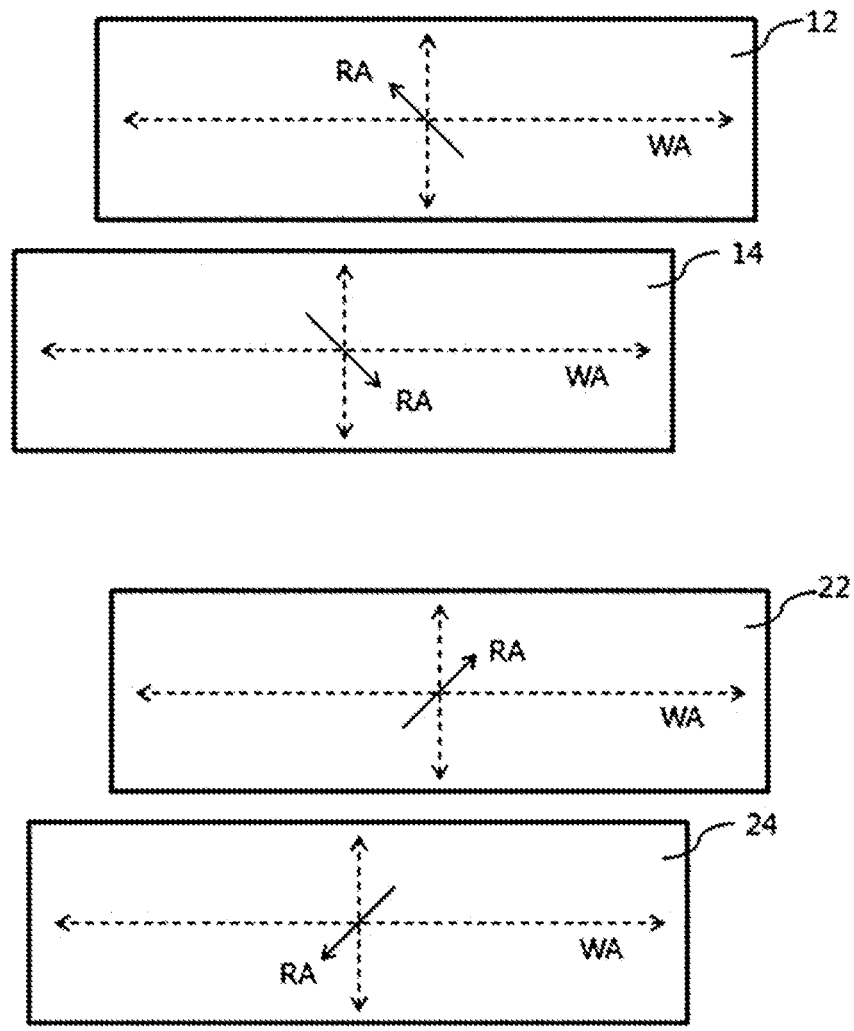

[Figure 5]
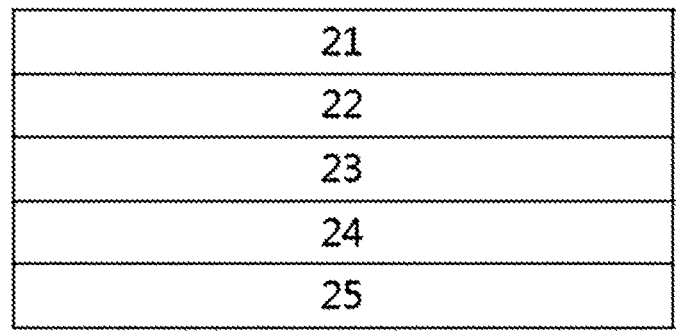
[Figure 6]
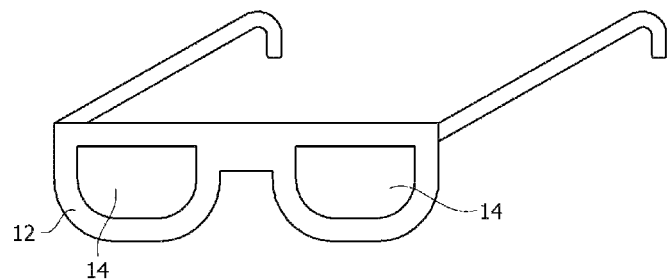
[Figure 7]
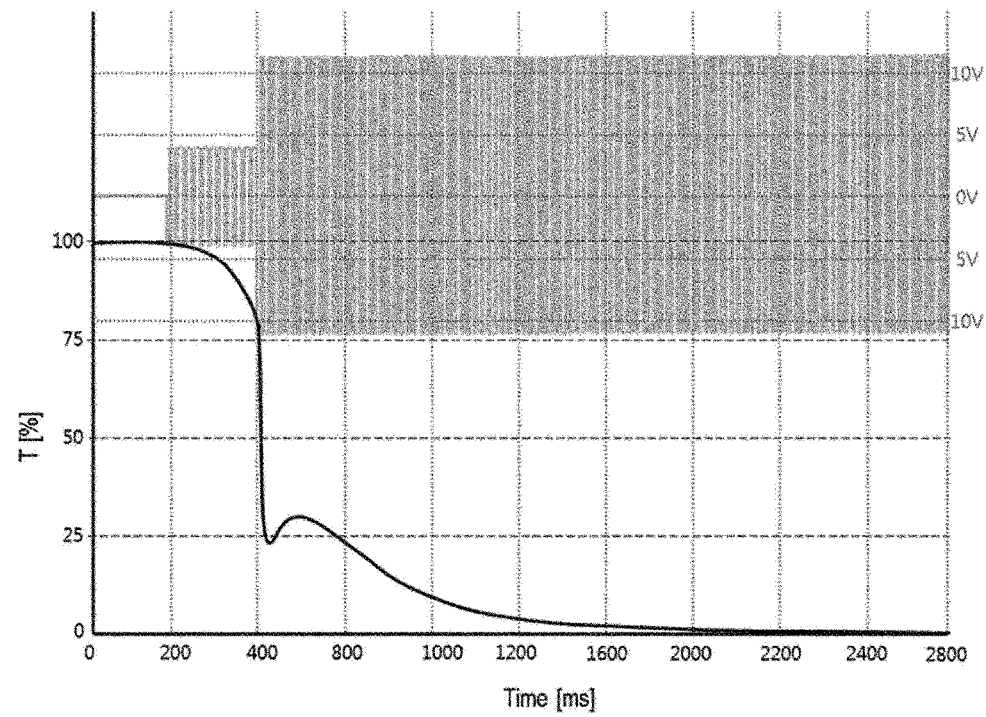

[Figure 8]
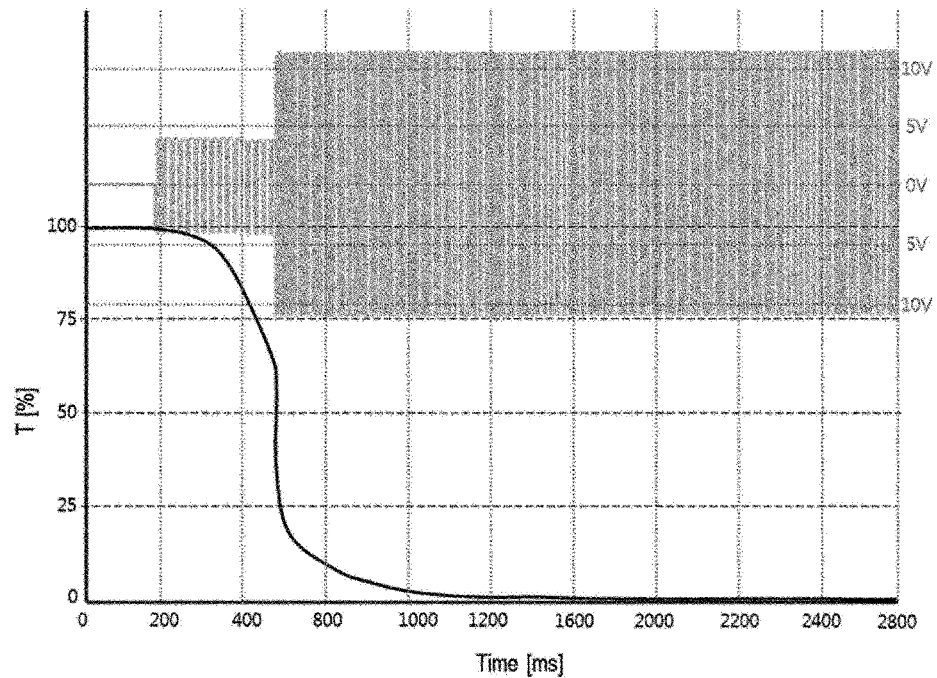
[Figure 9]
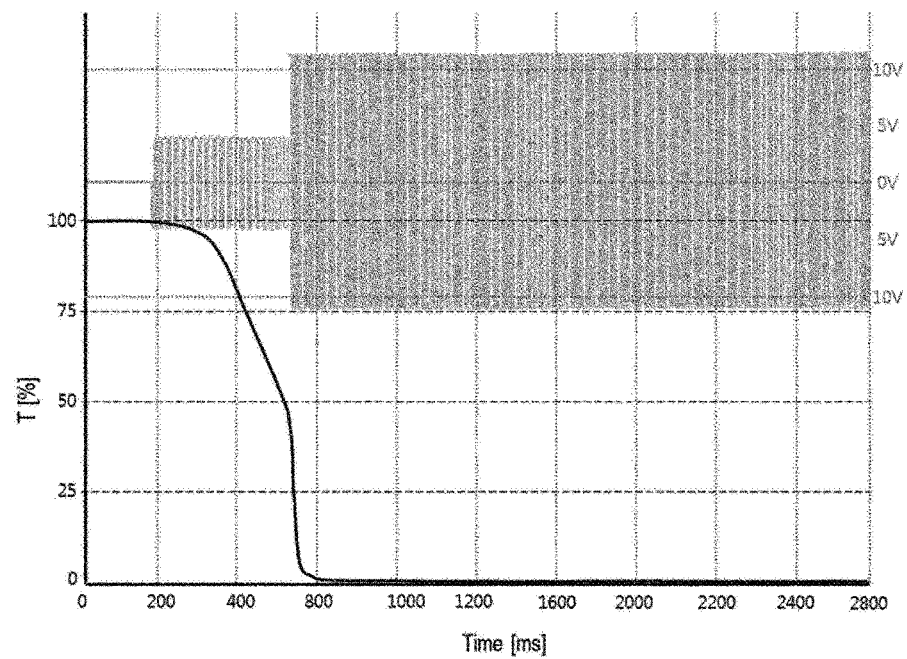

[Figure 10]
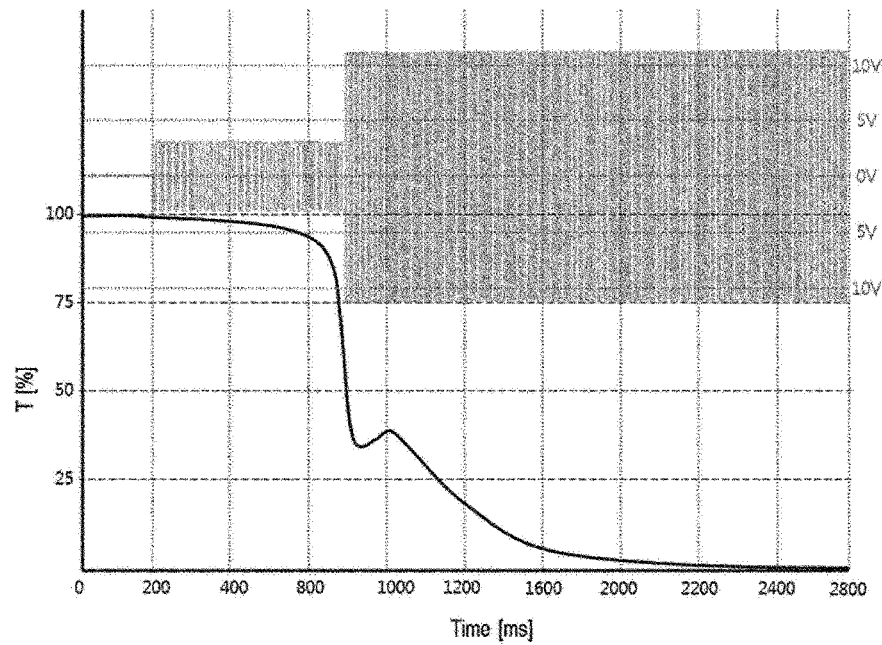
[Figure 11]
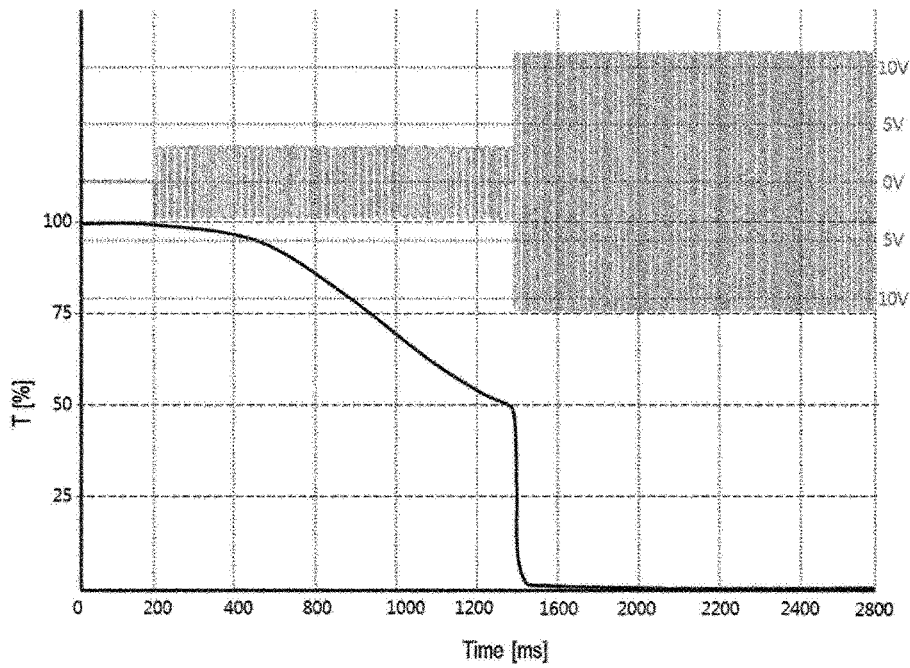

[Figure 12]
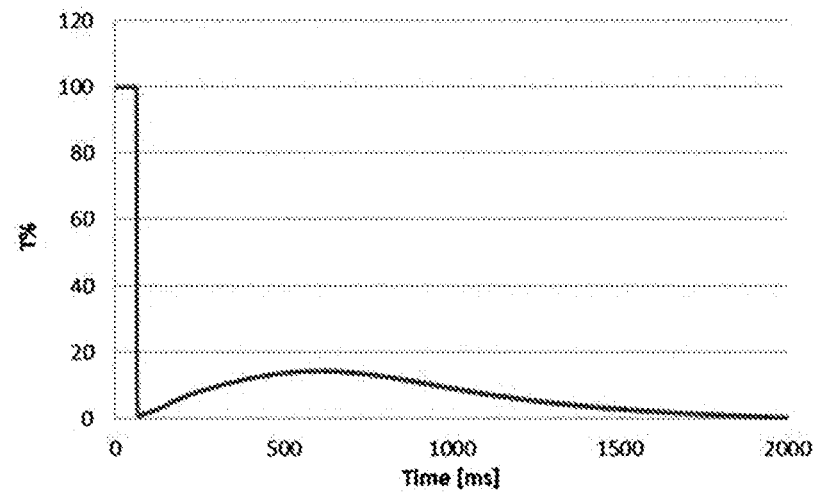
[Figure 13]
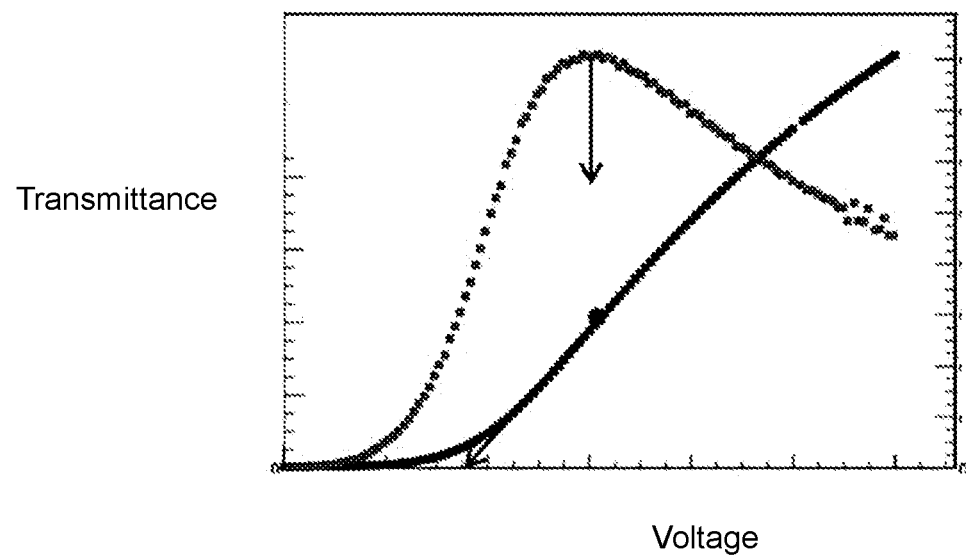

[Figure 14]
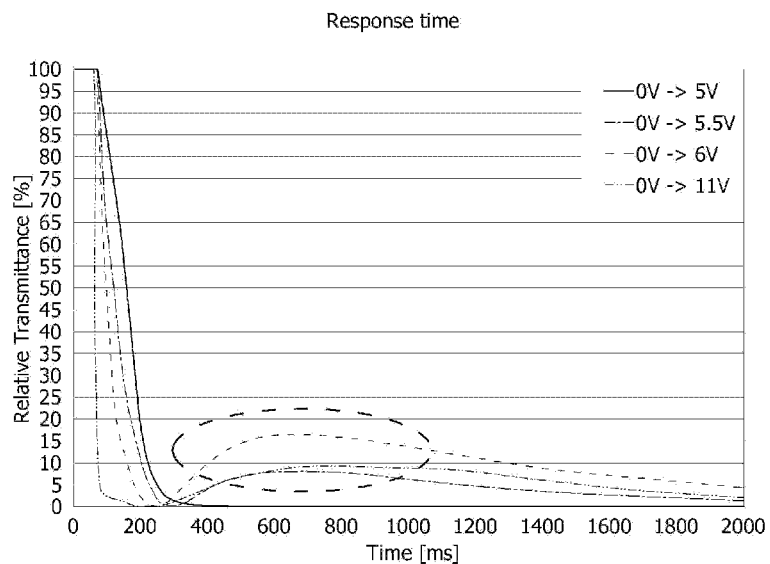
[Figure 15]
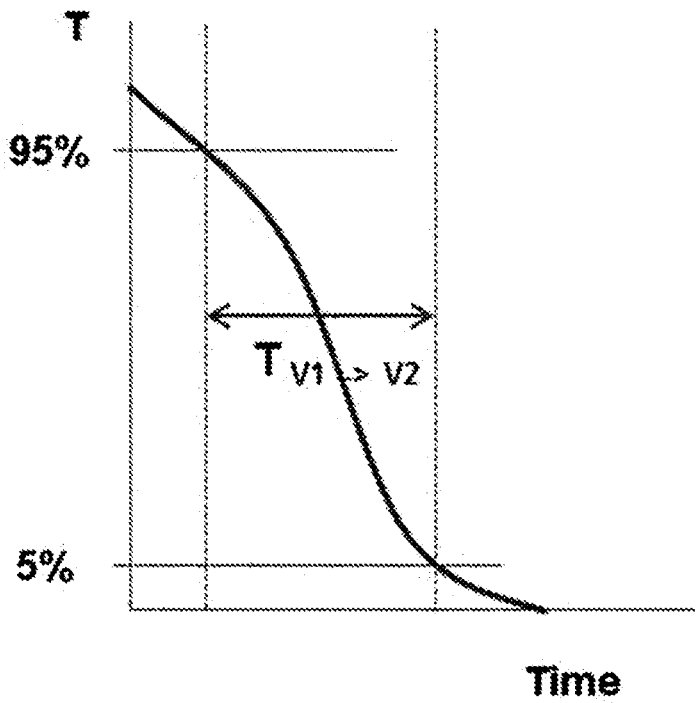

[Figure 16]
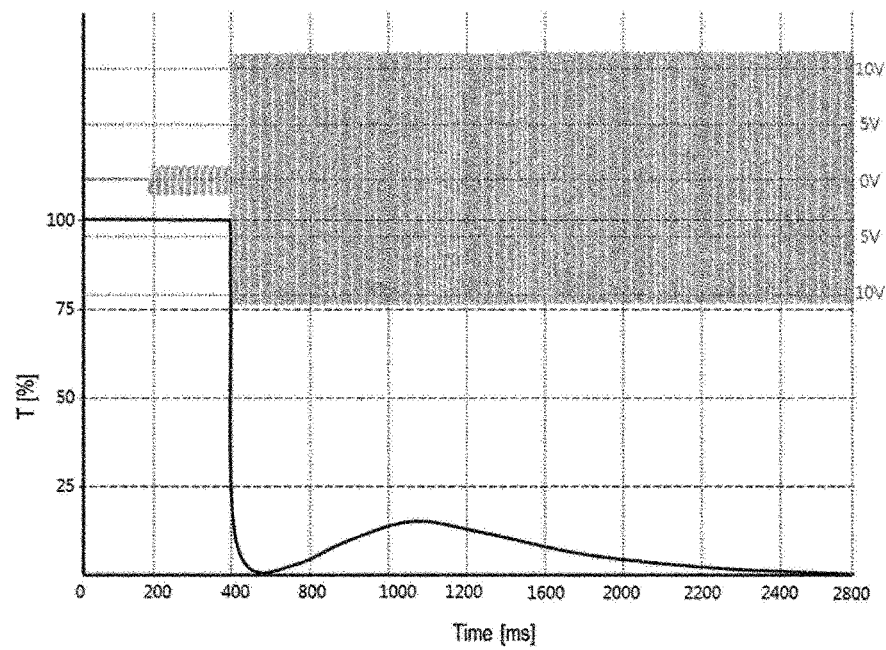

METHOD FOR DRIVING OPTICAL ELEMENT

CROSS-REFERENCE TO RELATED APPLICATIONS

The present application is a national phase entry under 35 U.S.C. § 371 of International Application No. PCT/KR2018/011367 filed Sep. 27, 2018, published in Korean, which claims priority from Korean Patent Application 10-2017-0127823 filed Sep. 29, 2017, all of which are incorporated herein by reference.

TECHNICAL FIELD

This application relates to a method for driving an optical element.

BACKGROUND ART

A transmittance-variable device using a so-called GH cell (guest host cell) applying a mixture of a liquid crystal host, which is mainly a liquid crystal compound, and a dichroic dye guest is known (for example, Patent Document 1: European Patent Publication No. 0022311).

Such a transmittance-variable device is applied to various applications including eyewear such as sunglasses, or building outer walls, vehicle sunroofs, and the like. Recently, the application of the transmittance-variable device to eyewear for experience of a so-called augmented reality (AR) has been studied.

Such a transmittance-variable device adjusts the transmittance by adjusting the orientation of the dichroic dye guest in the GH cell, and for example, often adjusts the transmittance by switching the orientation of the liquid crystal compound between the vertically oriented state and the horizontally oriented state.

SUMMARY

Technical Problem

It is an object of the present application to provide a method for driving an optical element. In one example, the present application may provide a method for driving an optical element capable of suppressing a back-flow phenomenon caused by a bulk liquid crystal compound even when a cell gap of a liquid crystal layer becomes thick, and ensuring excellent response speeds and driving characteristics.

TECHNICAL SOLUTION

The present application relates to a method for driving an optical element which comprises an active liquid crystal layer having an optical axis and including a liquid crystal compound, The liquid crystal layer may be configured to switch between a first state in which an orientation of the optical axis is in a vertically or horizontally oriented state and a second state in which the orientation of the optical axis is different from the first state. A voltage of the first state may be less than a voltage of the second state. The method may include: applying the voltage of the second state to the liquid crystal layer in the first state to switch the liquid crystal layer to the second state, and before applying the voltage of the second state, applying a medium voltage that is greater than or equal to a critical voltage and less than a back-flow voltage.

In some examples, the liquid crystal layer may further include a dichroic dye guest.

In some examples, the liquid crystal layer may have a thickness of 4 μm or more.

In some examples, the applied medium voltage may be an alternating voltage.

In some examples, the alternating voltage may have a frequency in a range of 40 Hz to 1 kHz.

In some examples, the voltage of the first state may be greater than zero and less than double the critical voltage.

In some examples, the critical voltage may be between 0.05 times to 0.2 times the voltage of the second state.

In some examples, the critical voltage may be in a range of 0.5V to 3V.

In some examples, the back-flow voltage may be between 0.3 times to 0.7 times the voltage of the second state.

In some examples, the medium voltage may be between 0.15 times to 0.5 times the voltage of the second state.

In some examples, the voltage of the second state may be in a range of 10V to 30V.

In some examples, the medium voltage may be applied for a holding time between 0.3 times to 1.2 times a duration of time required for occurrence of 90% transmittance fluctuation when the medium voltage is applied at the critical voltage.

In some examples, the medium voltage may be applied for 0.1 seconds to 10 seconds.

The present application also relates to an optical element including an active liquid crystal layer having an optical axis and including a liquid crystal compound. The liquid crystal layer may be configured to switch between a first state in which an orientation of the optical axis is in a vertically or horizontally oriented state and a second state in which the orientation of the optical axis is different from the first state.

The optical element may also include a power-supply device configured to apply a voltage to the liquid crystal layer.

The power-supply device may be set so that an applied voltage of a first state is less than an applied voltage of a second state The power supply device may be configured to, before applying the voltage of the second state to switch the liquid crystal layer to the second state, apply a medium voltage that is greater than or equal to a critical voltage and less than a back-flow voltage.

The present application also relates to a transmittance-variable device include an optical element as described in any of the embodiments herein, and either a second active liquid crystal layer or a passive polarizing layer disposed so as to overlap with the active liquid crystal layer included in the optical element.

The present application also relates to eyewear including a left eye lens and a right eye lens, and a frame for supporting the left eye lens and the right eye lens, in which each of the left eye lens and the right eye lens includes the optical element of any of the embodiments described herein.

In some examples, the eyewear may be an augmented reality experience device.

Advantageous Effects

In one example, the present application may provide a driving method suppressing a back-flow phenomenon caused by a bulk liquid crystal compound even when a cell gap of a liquid crystal layer becomes thick and ensuring excellent response speeds and driving characteristics, and an optical element to which such a driving method can be applied. Such an optical element and transmittance-variable device of the present application can be applied to various applications including various architectural or automotive materials which need to adjust the transmittance, or eyewear such as goggles for augmented reality experience or sports, sunglasses or helmets.

BRIEF DESCRIPTION OF DRAWINGS

FIG. 1 illustratively shows a transmittance-variable device of the present application.

FIG. 2 shows optical axes of first and second optical elements in a horizontally oriented state.

FIG. 3 shows pretilt directions of first to fourth vertical alignment films.

FIG. 4 illustratively shows a first optical element.

FIG. 5 illustratively shows a second optical element.

FIG. 6 illustratively shows eyewear.

FIGS. 7 to 11 show a state of the voltages applied in Examples 1 to 5 of the present application and the resulting transmittance change state.

FIG. 12 is a graph showing the relationship between the transmittance and the voltage application time in Comparative Example 1.

FIG. 13 is a voltage versus transmittance change graph for explaining a critical voltage.

FIG. 14 is a response speed graph for explaining a back-flow voltage.

FIG. 15 is a response speed graph for explaining T12 time.

FIG. 16 shows a state of voltages applied in Comparative Example 2 and the resulting transmittance change state.

DETAILED DESCRIPTION

The present application relates to a method for driving an optical element and an optical element to which such a driving method can be applied. The optical element of the present application can form a transmittance-variable device, alone or in combination with other elements. In this specification, the term transmittance-variable device may mean a device designed to be capable of switching between a high transmittance state and a low transmittance state.

In this specification, the high transmittance state can be referred to as a transmission state, and the low transmittance state can be referred to as a blocking state.

The transmission state may mean, for example, a state where the transmittance of the device is 40% or more, and the blocking state may mean a state where the transmittance of the device is 10% or less.

The higher the numerical value of the transmittance in the transmission state is, the more advantageous it is, and the lower the transmittance in the blocking state is, the more advantageous it is, so that each of the upper limit and the lower limit is not particularly limited. In one example, the upper limit of the transmittance in the transmission state may be about 100%, about 95%, about 90%, about 85%, about 80%, about 75%, about 70%, about 65% or about 60%. In another example, the transmittance in the transmission state may be about 45% or more, 50% or more, 55% or more, 60% or more, 65% or more, 70% or more, 75% or more, 80% or more, 85% or more, 90% or more, or 95% or more. The lower limit of the transmittance in the blocking state may be about 0%, about 1%, about 2%, about 3%, about 4%, about 5%, about 6%, about 7%, about 8%, about 9% or about 10%.

The transmittance may be linear light transmittance. The term linear light transmittance may be, relative to light incident on a transmittance-variable device in a predetermined direction, a ratio of light (straight-line light) transmitted through the transmittance-variable device in the same direction as the incident direction. In one example, the transmittance may be the result (normal light transmittance) measured for the light incident in a direction parallel to the surface normal of the transmittance-variable device or the result (oblique light transmittance) measured for the light incident in a direction forming an angle exceeding 0 degrees and within 20 degrees with the surface normal. In another example, the angle that the direction of the incident light for the measurement of the oblique light transmittance forms with the surface normal may be about 0.5 degree or more, about 1 degree or more, or about 1.5 degree or more, or may be about 19.5 degrees or less, about 19 degrees or less, about 18.5 degrees or less, about 18 degrees or less, about 17.5 degrees or less, about 17 degrees or less, about 16.5 degrees or less, about 16 degrees or less, about 15.5 degrees or less, about 15 degrees or less, about 14.5 degrees or less, about 14 degrees or less, about 13.5 degrees or less, about 13 degrees or less, about 12.5 degrees or less, about 12 degrees or less, about 11.5 degrees or less, about 11 degrees or less, about 10.5 degrees or less, about 10 degrees or less, about 9.5 degrees or less, about 9 degrees or less, about 8.5 degrees or less, about 8 degrees or less, about 7.5 degrees or less, about 7 degrees or less, about 6.5 degrees or less, about 6 degrees or less, about 5.5 degrees or less, about 5 degrees or less, about 4.5 degrees or less, about 4 degrees or less, about 3.5 degrees or less, or about 3 degrees or less.

The transmittance may be a numerical value for light of any wavelength in the visible light wavelength region, that is, the wavelength range of 400 to 700 nm, or an average value of numerical values for light of the entire wavelength.

Furthermore, the linear light transmittance in each transmission state as mentioned above is the transmittance in the state where the transmittance of the transmittance-variable apparatus is highest, and the linear transmittance in the blocking state is the transmittance in the state where the transmittance of the transmittance-variable apparatus is lowest.

The optical element of the present application comprises at least an active liquid crystal layer, and in one example, the active liquid crystal layer may be an active guest host liquid crystal layer (hereinafter, may be referred to as an active GH layer). Here, the active liquid crystal layer is a liquid crystal layer formed so that while it comprises at least a liquid crystal compound, the optical axis direction of the liquid crystal can be changed by an external signal, for example, a voltage or the like, and the active GH layer is a layer comprising at least a liquid crystal compound (liquid crystal host) and a dichroic dye guest, which may mean a liquid crystal layer formed so that the optical axis direction can also be changed by an external signal, for example, a voltage or the like.

Hereinafter, in this specification, the active liquid crystal layer is described as an active GH layer for the sake of convenience, but the matters for the active GH layer may also be applied to the active liquid crystal layer.

Here, the optical axis means an optical axis or a slow axis of the liquid crystal compound in the active liquid crystal layer or GH layer, where in the case of the liquid crystal compound in the form of a rod, it may mean the direction of the long axis and in the case of a discotic liquid crystal, it may mean an axis parallel to the normal direction of the disc plane.

The orientation of the dichroic dye contained in the GH layer is determined depending on the liquid crystal compound by a mechanism known as a so-called guest host effect.

The optical axis of the active GH layer can switch between a vertically oriented state and a horizontally oriented state.

Here, the vertically oriented state means a case where the optical axis or an average optical axis of the active liquid crystal layer or GH layer forms an angle in a range of approximately −10 degrees to 10 degrees, in a range of −8 degrees to 8 degrees, in a range of −6 degrees to 6 degrees, in a range of −4 degrees to 4 degrees or in a range of −2 degrees to 2 degrees with the normal direction of the plane of the GH layer, or is substantially parallel thereto. Also, the horizontally oriented state means a case where the optical axis or the average optical axis of the active liquid crystal layer or GH layer forms an angle in a range of approximately −10 degrees to 10 degrees, in a range of −8 degrees to 8 degrees, in a range of −6 degrees to 6 degrees, in a range of −4 degrees to 4 degrees or in a range of −2 degrees to 2 degrees with the direction perpendicular to the normal direction of the liquid crystal layer or GH layer, or substantially parallel thereto.

Here, the average optical axis may also be the vector sum of optical axes of the liquid crystal compound of the active liquid crystal layer or GH layer.

In one example, the active liquid crystal layer or GH layer of the optical element may be configured so that while it is present in the vertically oriented state in the state in which an external signal such as a voltage is not applied, it is switched to the horizontally oriented state when the external signal is applied and switched to the vertically oriented state when the external signal disappears again; or while it is present in the horizontally oriented state in the state in which an external signal such as a voltage is not applied, it is switched to the vertically oriented state when the external signal is applied and switched to the horizontally oriented state when the external signal disappears again.

In one example, the active liquid crystal layer or GH layer of the optical element may have a thickness of at least 4 μm or more.

Here, the thickness of the liquid crystal layer or GH layer has the same meaning as a cell gap of the liquid crystal layer or GH layer, and for example, as described below, when the liquid crystal layer or GH layer is formed between two substrates, it may mean the distance between the opposing surfaces of the two substrates.

The thicker the liquid crystal layer or GH layer, the wider the transmittance band can be realized, but in this case the ratio of a bulk liquid crystal layer becomes higher. However, according to the driving method of the present application, the ratio of the bulk liquid crystal layer can be minimized or suppressed even under a thick cell gap, and an optical element with excellent characteristics can be provided. Here, the transmittance band means the difference between the maximum transmittance and the minimum transmittance that can be exhibited by the optical element, and the bulk liquid crystal means a part of a liquid crystal layer whose orientation is not appropriately controlled by orientation force of an alignment layer or an external signal.

The cell gap may be about 5 μm or more, 6 μm or more, 7 μm or more, 8 μm or more, 9 μm or more, 10 μm or more, 11 μm or more, 12 μm or more, 13 μm or more, 14 μm or more, or 14.5 μm or more, and may be 30 μm or less, 29 μm or less, 28 μm or less, 27 μm or less, 26 μm or less, 25 μm or less, 24 μm or less, 23 μm or less, 22 μm or less, 21 μm or less, 20 μm or less, 19 μm or less, 18 μm or less, 17 μm or less, 16 μm or less, or 16.5 μm or less.

The kind of the liquid crystal compound contained in the active liquid crystal layer or GH layer is not limited, where a known liquid crystal compound known to be capable of forming a GH cell can be applied. For example, a nematic liquid crystal compound can be used as the liquid crystal compound. The liquid crystal compound may be a non-reactive liquid crystal compound. The non-reactive liquid crystal compound may mean a liquid crystal compound having no polymerizable group. Here, the polymerizable group can be exemplified by an acryloyl group, an acryloyloxy group, a methacryloyl group, a methacryloyloxy group, a carboxyl group, a hydroxyl group, a vinyl group or an epoxy group, and the like, but is not limited thereto, and known functional groups known as the polymerizable group can be included.

The liquid crystal compound included in the liquid crystal layer or GH layer may have positive dielectric constant anisotropy or negative dielectric constant anisotropy. In the present application, the term "dielectric constant anisotropy" may mean a difference between an extraordinary dielectric constant (ce) and an ordinary dielectric constant (co) of the liquid crystal compound. The dielectric constant anisotropy of the liquid crystal compound may be, for example, in a range within ±40, within ±30, within ±10, within ±7, within ±5 or within ±3. When the dielectric constant anisotropy of the liquid crystal compound is controlled within the above range, it may be advantageous in terms of driving efficiency of the liquid crystal element.

The refractive index anisotropy of the liquid crystal compound present in the liquid crystal layer or GH layer can be appropriately selected in consideration of desired physical properties, for example, transmission characteristics, contrast ratios, and the like. The term "refractive index anisotropy" may mean a difference between an extraordinary refractive index and an ordinary refractive index of a liquid crystal compound. The refractive index anisotropy of the liquid crystal compound may be in a range of, for example, 0.1 or more, 0.12 or more, or 0.15 or more through 0.23 or less, or 0.25 or less, or 0.3 or less.

The liquid crystal layer or GH layer may further comprise a dichroic dye. The dichroic dye may serve, for example, to control the transmittance of the device depending on orientation of a host material. In the present application, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region.

As the dichroic dye, for example, a known dye known to have properties that can be aligned depending on the alignment state of the liquid crystal molecules by a so-called host guest effect can be selected and used. An example of such a dichroic dye includes a so-called azo dye, an anthraquinone dye, a methine dye, an azomethine dye, a merocyanine dye, a naphthoquinone dye, a tetrazine dye, a phenylene dye, a quaterrylene dye, a benzothiadiazole dye, a diketopyrrolopyrrole dye, a squaraine dye or a pyromethene dye, and the like, but the dye applicable in the present application is not limited thereto. As the dichroic dye, for example, a black dye can be used. Such a dye is known, for example, as an azo dye or an anthraquinone dye, and the like, but is not limited thereto.

As the dichroic dye, a dye having a dichroic ratio, that is, a value obtained by dividing the absorption of the polarized light parallel to the long axis direction of the dichroic dye by the absorption of the polarized light parallel to the direction perpendicular to the long axis direction, of 5 or more, 6 or more, or 7 or more, can be used. The dye may satisfy the dichroic ratio in at least a part of the wavelengths or any one wavelength within the wavelength range of the visible light region, for example, within the wavelength range of about 380 nm to 700 nm or about 400 nm to 700 nm. The upper limit of the dichroic ratio may be, for example, 20 or less, 18 or less, 16 or less, or 14 or less or so.

The ratio of the dichroic dye in the liquid crystal layer or GH layer may be appropriately selected depending on desired physical properties, for example, transmittance-variable characteristics. For example, the dichroic dye may be included in the liquid crystal layer or GH layer in a ratio of 0.01 wt % or more, 0.1 wt % or more, 0.2 wt % or more, 0.3 wt % or more, 0.4 wt % or more, 0.5 wt % or more, 0.6 wt % or more, 0.7 wt % or more, 0.8 wt % or more, 0.9 wt % or more, or 1.0 wt % or more. The upper limit of the ratio of the dichroic dye in the liquid crystal layer or GH layer may be, for example, 2 wt % or less, 1.9 wt % or less, 1.8 wt % or less, 1.7 wt % or less, 1.6 wt % or less, 1.5 wt % or less, 1.4 wt % or less, 1.3 wt % or less, 1.2 wt % or less, or 1.1 wt % or less.

In the liquid crystal layer or GH layer, the total weight of the liquid crystal compound and the dichroic dye may be, for example, about 60 wt % or more, 65 wt % or more, 70 wt % or more, 75 wt % or more, 80 wt % or more, 85 wt % or more, 90 wt % or more, or 95 wt % or more, and in another example, it may be less than about 100 wt %, 98 wt % or less, or 96 wt % or less.

The liquid crystal layer or GH layer may further comprise known optional adding material used in the formation of the liquid crystal layer or GH layer, if necessary, in addition to the components, that is, liquid crystal compounds, dichroic dyes and chiral dopants.

The liquid crystal layer or GH layer may have an anisotropy degree (R) of, for example, about 0.5 or more. The anisotropy (R) can be measured by the method described in a reference "Polarized Light in Optics and Spectroscopy", D. S. Kliger et al., Academic Press, 1990.

In another example, the anisotropy degree (R) may be about 0.55 or more, 0.6 or more, or 0.65 or more. The anisotropy degree (R) may be, for example, about 0.9 or less, about 0.85 or less, about 0.8 or less, about 0.75 or less, or about 0.7 or less.

The anisotropy degree (R) can be achieved by controlling, for example, the kind and/or ratio of the liquid crystal compound (host), the kind and/or ratio of the anisotropic dye, or the cell gap and the like.

The liquid crystal layer or GH layer may be designed to have a pretilt angle in a predetermined range in the vertically oriented state.

The pretilt angle may mean an angle formed by the direction of the director of the liquid crystal compound with the plane of the liquid crystal layer or GH layer.

The method of controlling the pretilt angle of such a liquid crystal compound is not particularly limited and it can be controlled by a known method.

The pretilt angle may be, for example, 70 degrees or more and less than 90 degrees. By setting such a pretilt angle, it is possible to provide an optical element having a broader transmittance band and excellent response speeds and driving characteristics.

In one example, the pretilt angle may be about 71 degrees or more, about 72 degrees or more, about 73 degrees or more, about 74 degrees or more, about 75 degrees or more, about 76 degrees or more, about 77 degrees or more, about 78 degrees or more, about 79 degrees or more, about 80 degrees or more, about 81 degrees or more, about 82 degrees or more, about 83 degrees or more, about 84 degrees or more, about 85 degrees or more, about 86 degrees or more, or about 87 degrees or more, and may be about 89 degrees or less, about 88.5 degrees or less, or about 88 degrees or less.

The optical element may further comprise various other elements, while comprising at least the liquid crystal layer or GH layer.

In one example, the optical element may comprise first and second substrates disposed opposite to each other, wherein the liquid crystal layer or GH layer may be positioned between the first and second substrates.

As the substrate, a known material can be used without any particular limitation. For example, as the substrate, a glass film, a crystalline or amorphous silicon film, an inorganic film such as quartz or ITO (indium tin oxide) film or a plastic film, and the like can be used.

As the plastic substrate, a TAC (triacetyl cellulose) substrate; a COP (cycloolefin copolymer) substrate such as a norbornene derivative substrate; a PMMA (poly(methyl methacrylate)) substrate; a PC (polycarbonate) substrate; a PE (polyethylene) substrate; a PP (polypropylene) substrate; a PVA (polyvinyl alcohol) substrate; a DAC (diacetyl cellulose) substrate; a Pac (polyacrylate) substrate; a PES (polyether sulfone) substrate; a PEEK (polyetheretherketone) substrate; a PPS (polyfenylsulfone), PEI (polyetherimide) substrate; a PEN (polyethylenemaphthatate) substrate; a PET (polyethyleneterephtalate) substrate; a PI (polyimide) substrate; a PSF (polysulfone) substrate; a PAR (polyarylate) substrate or a substrate including an amorphous fluororesin or the like can be used, without being limited thereto. The thickness of such a substrate is not particularly limited, which can be selected within an appropriate range.

An electrode layer may be present on the substrate. For example, an electrode layer may be present on at least one surface or both surfaces of the surfaces facing the liquid crystal layer or GH layer in the substrate surfaces. This electrode layer may be an element for applying an external signal capable of switching the optical axis of the liquid crystal layer or GH layer. In the present application, the term inner surface of the substrate means a surface close to the liquid crystal layer or GH layer among both surfaces of the substrate.

The electrode layer may be formed using a known material, and for example, the electrode layer may comprise a conductive polymer, a conductive metal, a conductive nanowire, or a metal oxide such as ITO (indium tin oxide), and the like. The electrode layer may be formed to have transparency. In this field, various materials and forming methods capable of forming a transparent electrode layer are known, and all of these methods can be applied. If necessary, the electrode layer formed on the surface of the substrate may also be appropriately patterned.

A liquid crystal alignment layer may exist on the substrate. The liquid crystal alignment layer may also be formed on the inner surface of the substrate, that is, the surface facing the liquid crystal layer or GH layer. When the above-mentioned electrode layer is present on the substrate, the liquid crystal alignment layer may also be formed on the surface of the electrode layer or between the electrode layer and the substrate. For example, the liquid crystal alignment layer may exist on at least one surface or both surfaces of the inner surfaces of the substrates included in the transmittance-variable device.

As the alignment layer, various rubbing alignment layers or photo alignment layers known in the art can be used without any particular limitation. The alignment layer may be a horizontal alignment layer or a vertical alignment layer, and in one example, it may be a vertical alignment layer.

The optical element may further comprise a known element such as an antireflection layer or a hard coating layer in addition to the above structure.

The present application relates to a method for driving such an optical element. The driving method may be a driving method of an optical element which comprises an active liquid crystal layer including a liquid crystal compound and switching between a first state where the orientation of the optical axis is in a vertically or horizontally oriented state and a second state having an optical axis orientation different from the first state. The first state may be, for example, a vertically oriented state and the second state may be, for example, a horizontally oriented state. The driving method may comprise at least a step of applying a voltage to the active liquid crystal layer or GH layer in the first state to switch to the second state.

For the switching, a second state voltage ($V_3$) may be applied to the active liquid crystal layer or GH layer to which a first state voltage ($V_1$) is applied.

Here, the first state voltage is an applied voltage required to maintain the first state and the second state voltage is an applied voltage required to maintain the second state.

These first and second state voltages can have a relationship of Equation 1 below. That is, the second state voltage may be larger than the first state voltage.

$$V_1 < V_3 \qquad \text{[Equation 1]}$$

In Equation 1, $V_1$ is the first state voltage and $V_3$ is the second state voltage.

The driving method of the present application may comprise a step of applying a medium voltage satisfying Equation 2 below before applying the second state voltage to the active liquid crystal layer or GH layer in the first state.

$$VT \leq VM < VB \qquad \text{[Equation 2]}$$

In Equation 2, VT is a critical voltage, VB is a back-flow voltage, and VM is the medium voltage.

By adding such a medium voltage applying step, it is possible to suppress a back-flow phenomenon or the like that may occur in a switching process even under a thick cell gap, as described above.

Here, the critical voltage may mean a threshold voltage for driving the liquid crystals of the active liquid crystal layer or GH layer, and in one example, it may mean a minimum voltage at which fluctuation of transmittance occurs according to behavior of the liquid crystals depending on an external signal such as a voltage. For example, when the voltage versus transmittance change graph for the liquid crystal layer or GH layer has been plotted (black dotted line) as shown in FIG. 13 and the graph (gray dotted line) obtained by differentiating the graph has been shown, the voltage at the time when the inflection point (max point, indicated by an arrow) of the differentiated graph is identified can be defined as the critical voltage.

On the other hand, the back-flow voltage means a voltage associated with secondary behavior characteristics that when a high voltage signal is generally applied to the active liquid crystal layer or GH layer at the low voltage, a number of liquid crystal domains, which have been aligned in the reverse direction and return, occur to cause 5% or more of the transmittance fluctuation.

For example, as indicated by a dotted line in FIG. 14, such a back-flow voltage may be defined as a voltage corresponding to a high voltage of voltages at which 5% or more of rearrangement sections (shoulder) occur in a response speed graph (X-axis: response speed, Y-axis: relative transmittance) upon transition from a low voltage to a high voltage.

Any or all of the voltages applied in the above step, that is, the first state voltage, the second state voltage, the critical voltage, the medium voltage and the back-flow voltage may be alternating voltages. In this case, it is simply referred to as a voltage, but the corresponding term may mean the amplitude of the alternating voltage. In the case of an alternating voltage, the applied frequency may be in a range of 40 Hz to 1 kHz. The frequency may be specifically 40 Hz to 750 Hz, 40 Hz to 500 Hz, or 40 Hz to 100 Hz.

Here, the first state voltage may satisfy Equation 3 below.

$$0 \leq V_1 < 2 \times VT \qquad \text{[Equation 3]}$$

In Equation 3, $V_1$ is the first state voltage and VT is the critical voltage.

That is, in one example, the first state may be a state where no voltage is applied, or a weakly applied state, that is, an initial state.

In the above state, the critical voltage (VT) can satisfy Equation 4 below.

$$VT = 0.05 \times V_3 \text{ to } 0.2 \times V_3 \qquad \text{[Equation 4]}$$

In Equation 4, VT is the critical voltage and $V_3$ is the second state voltage.

In another example, the critical voltage (VT) may be about $0.07V_3$ or more, $0.09V_3$ or more, $0.1V_3$ or more, or $0.15V_3$ or more, or may be about $0.19V_3$ or less.

In another example, the critical voltage may be in a range of about 0.5V to 3V, but is not limited thereto.

Furthermore, in the above state, the back-flow voltage (VB) can satisfy Equation 5 below.

$$VB = 0.3 \times V_3 \text{ to } 0.7 \times V_3 \qquad \text{[Equation 5]}$$

In Equation 5, VB is the back-flow voltage and $V_3$ is the second state voltage.

In another example, the back-flow voltage (VB) may be about $0.35V_3$ or more, or $0.4V_3$ or more, or may be about $0.65V_3$ or less, $0.6V_3$ or less, $0.55V_3$ or less, or $0.5V_3$ or less.

The above-mentioned specific critical voltage or back-flow voltage value may vary depending on the state of the specific optical element.

On the other hand, the applied medium voltage may satisfy Equation 2 above and, if necessary, may also satisfy Equation 6 below.

$$VM = 0.15 \times V_3 \text{ to } 0.5 \times V_3 \qquad \text{[Equation 6]}$$

In Equation 6, VM is the medium voltage and $V_3$ is the second state voltage.

In another example, the medium voltage (VM) may be about $0.2V_3$ or more, or $0.25V_3$ or more, or may be about $0.45V_3$ or less, or $0.35V_3$ or less.

In the present application, the object can be achieved by a method of applying a medium voltage satisfying the above relationship before application of the second state voltage.

On the other hand, in the present application, the specific size of the second state voltage is not particularly limited, and for example, an appropriate range can be selected in consideration of the configuration state of the optical element. In one example, the second state voltage may be in the range of about 10V to 30V.

In the driving method of the present application, the time for applying the medium voltage is not particularly limited, but it can be applied for a holding time (TM) satisfying Equation 7 below.

$$0.3 \times T_{12} \leq TM \leq 1.2 \times T_{12} \quad \text{[Equation 7]}$$

In Equation 7, TM is the medium voltage holding time, and $T_{12}$ is the time required for occurrence of 90% transmittance fluctuation in the response speed graph when the medium voltage is applied at the critical voltage.

Here, the time required for occurrence of 90% transmittance fluctuation may be, for example, the time required for change from 95% transmittance to 5% transmittance or the time required for change from 5% transmittance to 95% transmittance. Here, the fluctuated transmittance may be general transmittance or relative transmittance.

One example of measuring the $T_{12}$ is shown in FIG. 15.

If the medium voltage application time satisfies Equation 7 above, specifically, it is not particularly limited, but the medium voltage may be applied for about 0.1 seconds to 10 seconds. In another example, the application time may be about 0.15 seconds or more, about 0.2 seconds or more, or may be about 9 seconds or less, about 8 seconds or less, about 7 seconds or less, about 6 seconds or less, about 5 seconds or less, about 4 seconds or less, about 3 seconds or less, about 2 seconds or less, or about 1 second or less or so.

In the present application, the object can be achieved by a method of applying a medium voltage satisfying the above relationship for the application time before the application of the second state voltage.

The present application also relates to an optical element set to enable such driving.

The optical element may comprise at least the above-described active liquid crystal layer or GH layer and a power-supply device.

For the details of the active liquid crystal layer or GH layer, the already-described contents may be applied equally.

In addition, the power-supply device may be set so that the applied state of the first state voltage ($V_1$) the applied state of the medium voltage and the applied state of the second state voltage ($V_3$) as described above can be implemented.

For the first and second state voltages and the medium voltage applied by the power-supply device, and the application time of the medium voltage, the already-described contents may be applied equally.

The present application also relates to a transmittance-variable device. The term transmittance-variable device may mean a device designed to be capable of switching between a transmission state and a blocking state, as described above.

The transmittance-variable device may be composed of the above-described optical element alone, or may also comprise other elements. The kind of the other elements is not particularly limited, which can be exemplified by, for example, a passive polarizing layer, or an active liquid crystal layer or GH layer (hereinafter, may be referred to as a second active liquid crystal layer or GH layer for convenience, for the sake of distinguishing from an active liquid crystal layer or GH layer of an optical element). Here, as the passive polarizing layer, for example, a known linear polarizer such as a PVA (polyvinyl alcohol) polarizer can be used. The passive polarizing layer, or the active liquid crystal layer or GH layer may be disposed so as to overlap with the optical element. For example, in the transmission state, the optical axis of the active liquid crystal layer or GH layer in the optical element of the present application can be maintained parallel to the absorption axis of the passive polarizing layer, or the active liquid crystal layer or GH layer can be vertically oriented therewith, and in the blocking state, the optical axis of the active liquid crystal layer or GH layer can be vertically oriented with the absorption axis of the passive polarizing layer to maintain the transmission and blocking states.

If the optical element and the second active liquid crystal layer or GH layer are included, in the transmission state, the optical axis of the active liquid crystal layer or GH layer of the optical element and the second active liquid crystal layer or GH layer can be maintained in a vertically oriented state to each other, or any one may be in a vertically oriented state and the other may be maintained in a horizontally oriented state, or they can be horizontally oriented such that their optical axes are parallel to each other, and in the blocking state, the optical axes of the two liquid crystal layers or GH layers can be oriented perpendicular to each other.

Here, as the second active liquid crystal layer or GH layer, the liquid crystal layer or GH layer of the same type as that contained in the optical element already described can be used, or other known active liquid crystal layer or GH layer can also be used. Such a second active liquid crystal layer or GH layer can also switch between the vertically oriented state and the horizontally oriented state.

Hereinafter, a case where the transmittance-variable device comprises the optical element and the second active liquid crystal layer or GH layer will be described illustratively. In this case, for convenience, the liquid crystal layer or GH layer included in the optical element may be referred to as a first active liquid crystal layer or GH layer.

In the structure including two active liquid crystal layers or GH layers as above, the switching between the transmission and blocking states can be made by controlling the orientation of the dichroic dye in each active liquid crystal layer or GH layer.

The first and second active liquid crystal layers or GH layers may be overlapped with each other and included. Accordingly, the light transmitted through the first active liquid crystal layer or GH layer can be incident on the second active liquid crystal layer or GH layer, and on the contrary, the light transmitted through the second active liquid crystal layer or GH layer can also be incident on the first active liquid crystal layer or GH layer.

FIG. 1 is a diagram schematically showing a state where the first active liquid crystal layer or GH layer (10) and the second active liquid crystal layer or GH layer (20) overlap each other as above.

In this specification, such a structure may be referred to as a double cell structure.

The first and second active liquid crystal layers or GH layers may switch between vertically oriented and horizontally oriented states, respectively. In one example, the switching between the vertically oriented and horizontally oriented states can be performed by the presence or absence of the applied voltage. For example, in a state where a voltage is not applied, the voltage may be applied to the active liquid crystal layer or GH layer in the vertically oriented state to switch to the horizontally oriented state, or on the contrary, the voltage may be applied to the active liquid crystal layer or GH layer in the horizontally oriented state to switch to the vertically oriented state.

In the horizontally oriented state, the optical axes of the first active liquid crystal layer or GH layer and the second active liquid crystal layer or GH layer may form an angle in a range of about 85 degrees to 95 degrees, or may be orthogonal. In one example, as shown in FIG. 2, any one of the first and second active liquid crystal layers or GH layers (10, 20), for example, the first active liquid crystal layer or GH layer (10) may have an optical axis (OA) in a range of 40 degrees to 50 degrees in the clockwise direction based on the horizontal axis (WA) of the active liquid crystal layer or GH layer and the other, for example, the second active liquid crystal layer or GH layer (20) may have an optical axis (OA) in a range of 130 degrees to 140 degrees in the clockwise direction based on the horizontal axis (WA) of the active liquid crystal layer or GH layer. Through such an optical axis relationship between the first active liquid crystal layer or GH layer and the second active liquid crystal layer or GH layer, it is possible to provide a transmittance-variable device having superior left-right symmetry by reducing the difference in the contrast ratio between the left and right viewing angles.

In this specification, the horizontal axis (WA) of the active liquid crystal layer or GH layer may mean a direction parallel to the long axis direction of the active liquid crystal layer or GH layer, or a direction parallel to the line connecting both eyes of an observer wearing eyewear or an observer observing a display device when it is applied to the eyewear or the display device such as a TV.

As described above, the term "active GH layer" may mean a functional layer that anisotropic dyes may be arranged together depending on arrangement of the liquid crystal compound to exhibit anisotropic light absorption characteristics with respect to an orientation direction of the anisotropic dyes and the direction perpendicular to the orientation direction, respectively. For example, the anisotropic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the anisotropic dye is assumed to be a p-type dye.

The active liquid crystal layer or GH layer may function as an active polarizer. In this specification, the term "active polarizer" may mean a functional element capable of controlling anisotropic light absorption depending on application of external action. For example, the active liquid crystal layer or GH layer can control the anisotropic light absorption for the polarized light in the direction parallel to the arrangement direction of anisotropic dyes and the polarized light in the vertical direction by controlling the arrangement of the liquid crystal compound and anisotropic dyes. Since the arrangement of liquid crystals and anisotropic dyes can be controlled by the application of external action such as a magnetic field or an electric field, the active liquid crystal layer or GH layer can control anisotropic light absorption depending on the application of external action.

The transmittance-variable device may further comprise two alignment layers disposed on both sides of the first active liquid crystal layer or GH layer and the second active liquid crystal layer or GH layer, respectively. In one example, the transmittance-variable device has a structure comprising a first optical element including a first vertical alignment layer, a first active liquid crystal layer or GH layer and a second vertical alignment layer sequentially and a second optical element including a third vertical alignment layer, a second active liquid crystal layer or GH layer and a fourth vertical alignment layer sequentially, wherein the first optical element may be the above-described optical element.

The transmittance-variable device of the present application can adjust the transmittance by adjusting the orientation direction of the first active liquid crystal layer or GH layer and the second active liquid crystal layer or GH layer upon application of no voltage and/or upon application of a voltage. The orientation direction can be adjusted by adjusting pretilt angles and pretilt directions of the first to fourth vertical alignment layers.

In this specification, the pretilt may have an angle and a direction. The pretilt angle may be referred to as a polar angle, and the pre-tilt direction may also be referred to as an azimuthal angle.

The pretilt angle has the same meaning as the pretilt angle described in the optical element item.

In one example, the first to fourth vertical alignment layers may have a pretilt angle in the above-mentioned range, that is, 70 degrees or more and less than 90 degrees, or may have the pretilt angles of various examples mentioned in the optical element item. Within this range, it is possible to provide a transmittance-variable device having excellent initial transmittance.

In one example, the pretilt angle of the first vertical alignment layer may be an angle measured in a clockwise or counterclockwise direction based on the horizontal plane of the alignment layer, and the pretilt angle of the second vertical alignment layer may be an angle measured in the reverse direction, that is, the counterclockwise direction when the pretilt angle of the first vertical alignment layer is measured in the clockwise direction or the clockwise direction when the pretilt angle of the first vertical alignment layer is measured in the counterclockwise direction.

The pretilt angle of the third vertical alignment layer may be an angle measured in a clockwise or counterclockwise direction based on the horizontal plane of the alignment layer or the like, and the pretilt angle of the fourth vertical alignment layer may be an angle measured in the reverse direction, that is, the counterclockwise direction when the pretilt angle of the third vertical alignment layer is measured in the clockwise direction or the clockwise direction when the pretilt angle of the third vertical alignment layer is measured in the counterclockwise direction.

The pretilt direction may mean a direction in which the director of the liquid crystal molecules is projected on the horizontal plane of the alignment layer. In one example, the pre-tilt direction may be an angle formed by the projected direction and the horizontal axis (WA). The pretilt direction of the vertical alignment layer can induce the orientation direction of the horizontally oriented state when a voltage is applied to the liquid crystal cell.

The pretilt direction of the first and second vertical alignment layers and the pretilt direction of the third and fourth vertical alignment layers may intersect with each other. In one example, the pretilt direction of the first and second vertical alignment layers and the pretilt direction of the third and fourth vertical alignment layers may be orthogonal to each other, for example, 85 degrees to 95 degrees or about 90 degrees. If the pretilt direction satisfies the above condition, it is possible to provide a transmittance-variable device having an excellent light shielding ratio upon application of a voltage.

In one example, any one direction of the pretilt direction of the first and second vertical alignment layers and the pretilt direction of the third and fourth vertical alignment layers, for example, the pretilt direction of the first and second vertical alignment layers may have an optical axis (OA) in a range of 40 degrees to 50 degrees in the clockwise direction based on the horizontal axis (WA) of the active liquid crystal layer or GH layer, and the other direction, for example, the pretilt direction of the third and fourth vertical alignment layers may have an optical axis (OA) in a range of 130 degrees to 140 degrees in the clockwise direction based on the horizontal axis (WA) of the active liquid crystal layer or GH layer. Through this relationship, it is possible to provide a transmittance-variable device having superior left-right symmetry by reducing the difference in the contrast ratio between the left and right viewing angles.

In one example, the pretilt angle and direction as mentioned above may be the pretilt angle and direction measured in each active liquid crystal layer or GH layer in the case where the active liquid crystal layer or GH layer of each active liquid crystal layer or GH layer is in a vertically oriented state.

The first to fourth vertical alignment layers may be a rubbing alignment layer or a photo-alignment layer. In the case of the rubbing alignment layer, the alignment direction is determined by the rubbing direction, and in the case of the photo-alignment layer, it is determined by the polarization direction of the irradiated light. The pretilt angle and the pretilt direction of the vertical alignment layer may be realized by adjusting orientation conditions, for example, a rubbing condition or a pressure condition upon rubbing orientation, or optical orientation conditions, for example, a polarizing state of light, an irradiation angle of light, an irradiation intensity of light and the like appropriately.

For example, when the vertical alignment layer is a rubbing alignment layer, the pretilt angle can be achieved by controlling the rubbing intensity of the rubbing alignment layer or the like, and the pretilt direction can be achieved by controlling the rubbing direction of the rubbing alignment layer, where this method of achievement is a known method. Furthermore, in the case of the photo-alignment layer, they can be achieved by the alignment layer material, the direction, state or intensity of the polarized light applied to the orientation.

In one example, the first to fourth vertical alignment layers may be rubbing alignment layers. Each of the first to fourth vertical alignment layers may have a specific orientation direction.

For example, the rubbing directions of the first and second vertical alignment layers are reverse directions to each other, which may form about 170 degrees to 190 degrees, and the rubbing directions of the third and fourth vertical alignment layers are also reverse directions to each other, which may form about 170 degrees to 190 degrees.

The rubbing direction can be confirmed through the measurement of the pretilt angle, where since the liquid crystals generally lie along the rubbing direction and generates the pretilt angle, it is possible to measure the rubbing direction by measuring the pretilt angle in the manner described in the following examples.

In one example, as shown in FIG. 3, the rubbing orientation direction (RA) of the first vertical alignment layer (12) may be 40 degrees to 50 degrees, the rubbing orientation direction (RA) of the second vertical alignment layer (14) may be 220 degrees to 230 degrees, the rubbing orientation direction (RA) of the third vertical alignment layer (22) may be 130 degrees to 140 degrees, and the rubbing orientation direction (RA) of the fourth vertical alignment layer (24) may be 310 degrees to 320 degrees. Through such relationships of the rubbing orientation directions of the first to fourth vertical alignment layers, it is possible to provide a transmittance-variable device capable of effectively performing the switching between the vertically oriented state and the horizontally oriented state. Each rubbing orientation direction (RA) is an angle measured in the clockwise direction or counterclockwise direction based on the horizontal axis (WA). However, the direction for measuring each rubbing orientation direction (RA) is measured by selecting only any one of the clockwise and counterclockwise directions.

As shown in FIG. 3, both of the angle formed by the rubbing orientation direction (RA) of the first vertical alignment layer (12) and the horizontal axis (WA) and the angle formed by the rubbing orientation direction (RA) of the second vertical alignment layer (14) and the horizontal axis (WA) are in the range of 40 degrees to 50 degrees when measured in the clockwise direction based on the horizontal axis (WA), and the rubbing orientation direction (RA) of the first vertical alignment layer (12) and the rubbing orientation direction (RA) of the second vertical alignment layer (14) may be reverse directions to each other.

As shown in FIG. 3, both of the angle formed by the rubbing orientation direction (RA) of the third vertical alignment layer (22) and the horizontal axis (WA) and the angle formed by the rubbing orientation direction (RA) of the fourth vertical alignment layer (24) and the horizontal axis (WA) are in the range of 130 degrees to 140 degrees when measured in the clockwise direction based on the horizontal axis (WA), and the rubbing orientation direction (RA) of the third vertical alignment layer (22) and the rubbing orientation direction (RA) of the fourth vertical alignment layer (24) may be reverse directions to each other.

Even if the photo-alignment layer is used as the first to fourth vertical alignment layers, the conditions can be controlled such that the above-mentioned pretilt angle and direction can be achieved.

An exemplary transmittance-variable device may further comprise an electrode layer disposed outside the first to fourth vertical alignment layers, where the specific type of the electrode layer is as mentioned in the description of the optical element.

FIG. 4 illustratively shows a first optical element comprising an active liquid crystal layer or GH layer, an electrode layer and a vertical alignment layer. As shown in FIG. 4, the first optical element (10) may comprise a first electrode layer (11), a first vertical alignment layer (12), a first active liquid crystal layer or GH layer (13), a second vertical alignment layer (14) and a second electrode layer (15) sequentially. The thicknesses of the first and second electrode layers and the first and second vertical alignment layers may be appropriately selected in consideration of the object of the present application.

FIG. 5 illustratively shows a second optical element comprising an active liquid crystal layer or GH layer, an electrode layer and a vertical alignment layer. As shown in FIG. 5, the second optical element (20) may comprise a third electrode layer (21), a third vertical alignment layer (22), a second active liquid crystal layer or GH layer (23), a fourth vertical alignment layer (24) and a fourth electrode layer (25) sequentially. The thicknesses of the third and fourth electrode layers and the third and fourth vertical alignment layers may be appropriately selected in consideration of the object of the present application.

The transmittance-variable device of the present application may further comprise a pressure-sensitive adhesive. The first and second optical elements may be present in a state of being stuck to each other by the pressure-sensitive adhesive. As the pressure-sensitive adhesive, a pressure-sensitive adhesive layer used for attaching the optical film may be appropriately selected and used. The thickness of the pressure-sensitive adhesive may be appropriately selected in consideration of the object of the present application.

The transmittance-variable device of the present application may further comprise a hard coating film. The hard coating film may comprise a base film and a hard coating layer on the base film. As the hard coating film, a known hard coating film may be appropriately selected in consideration of the object of the present application, and used. The thickness of the hard coating film may be appropriately selected in consideration of the object of the present application.

The hard coating film may be formed on the outside of the first and/or second optical elements through a pressure-sensitive adhesive. For example, the hard coating film may be attached to the outside of a substrate, on which the first and/or fourth electrode layers are formed, via a pressure-sensitive adhesive. As the pressure-sensitive adhesive, a pressure-sensitive adhesive to be used for attachment of the optical film may be appropriately selected and used.

In the present application, the transmittance-variable device may further comprise an antireflection film. The antireflection film may comprise a base film and an antireflection layer on the base film. As the antireflection film, a known antireflection film may be appropriately selected in consideration of the object of the present application, and used. The thickness of the antireflection film may be appropriately selected in consideration of the object of the present application.

The antireflection film may be formed on the outside of the first and/or second optical elements through a pressure-sensitive adhesive. For example, the antireflection film may be attached to the outside of a substrate, on which the first electrode layer and/or the fourth electrode layer is present, via a pressure-sensitive adhesive. As the pressure-sensitive adhesive, a pressure-sensitive adhesive to be used for attachment of the optical film may be appropriately selected and used.

As described above, the transmittance-variable device of the present application can adjust the transmittance depending on the presence or absence of the applied voltage by adjusting the oriented state upon application of no voltage and upon application of a voltage to the first and second active liquid crystal layers or GH layers. The liquid crystals and anisotropic dyes can be aligned according to the orientation direction. Therefore, the orientation direction may be parallel to the optical axis direction of the liquid crystal and/or the absorption axis direction of the anisotropic dye.

In one example, the transmittance-variable device may implement the transmission state when the first and second optical elements are in vertically oriented states, respectively, and may implement the blocking state when they are in horizontally oriented states.

As described above, in the horizontally oriented state, the first active liquid crystal layer or GH layer may have an optical axis in a range of 40 degrees to 50 degrees in the clockwise direction based on the horizontal axis of the active liquid crystal layer or GH layer, the second active liquid crystal layer or GH layer may have an optical axis in a range of 130 degrees to 140 degrees in the clockwise direction based on the horizontal axis of the active liquid crystal layer or GH layer. Through such an optical axis relationship between the first active liquid crystal layer or GH layer and the second active liquid crystal layer or GH layer, it is possible to provide a transmittance-variable device having superior left-right symmetry by reducing the difference in the contrast ratio between the left and right viewing angles.

The transmittance-variable device as above can be applied to various applications. The applications to which the transmittance-variable device can be applied can be exemplified by openings in enclosed spaces including buildings, containers or vehicles, and the like, such as windows or sunroofs, or eyewear, and the like. Here, in the range of eyewear, all eyewear formed so that an observer can observe the outside through lenses, such as general glasses, sunglasses, sports goggles or helmets, or instruments for experiencing augmented reality, can be included.

A typical application to which the transmittance-variable device of the present application may be applied is eyewear. Recently, sunglasses, sports goggles, augmented reality experience devices, and the like are commercially available as eyewear in the form in which lenses are mounted so as to be inclined to an observer's frontal line of sight. In the case of the transmittance-variable device of the present application, as described above, excellent left-right symmetry can be ensured by reducing the difference in the contrast ratio between the left and right tilt angles when observed in the oblique direction, thereby being effectively applied to the eyewear having the above structure.

When the transmittance-variable device of the present application is applied to eyewear, the structure of the eyewear is not particularly limited. That is, the transmittance-variable device may be mounted and applied in a lens for a left eye and/or a right eye having a known eyewear structure.

For example, the eyewear may comprise a left eye lens and a right eye lens; and a frame for supporting the left eye lens and the right eye lens.

FIG. 6 is an exemplary schematic diagram of the eyewear, which is a schematic diagram of the eyewear comprising the frame (32) and the left and right eye lenses (34), and the eyewear structure to which the transmittance-variable device of the present application can be applied is not limited to FIG. 6.

In the eyewear, the left eye lens and the right eye lens may each comprise the transmittance-variable device. Such a lens may comprise only the transmittance-variable device, or may also comprise other configurations.

The eyewear may have various designs, and for example, the frame may be formed to be inclined so that when an observer wears the eyewear, the angle formed by the observer's front sight line direction and the normal of the surface of the transmittance-variable device is in a range of 15 degrees to 40 degrees. Such eyewear can be exemplified by sports goggles or augmented reality experience devices, and the like. When the transmittance-variable device is formed to be inclined to the eyewear, the contrast ratio at the tilt angle can also be improved by adjusting the pretilt angles of the first to fourth vertical alignment layers.

EXAMPLE EMBODIMENTS

Hereinafter, the optical element of the present application will be described in detail by way of examples and comparative examples, but the scope of the optical element of the present application is not limited by the following examples.

Production Example 1

Production of Optical Element

An optical element was produced by forming a GH layer between two COP (cycloolefin polymer) films in which an ITO (indium tin oxide) electrode layer and a vertical alignment layer were sequentially formed on the surface. Here, the thickness of the GH layer, that is, the cell gap was set to about 12 μm. Here, as the vertical alignment layer, an alignment layer having a pretilt angle of about 88 degrees was used. The alignment layer was formed to a thickness of about 200 nm by coating a polyimide-based vertical alignment layer on the ITO electrode layer by bar coating, holding the film at 130° C. for about 30 minutes and rubbing the film with a rubbing cloth, and the two COP films were laminated so that the rubbing directions were equal to each other. Also, the GH layer was formed by applying a GH mixture in which nematic liquid crystals having dielectric constant anisotropy of about −4.9 and refractive index anisotropy of about 0.132 as a liquid crystal compound and a black dye having a dichroic ratio of about 6.5 to 8 as a dichroic dye were mixed in a weight ratio of 97:3 (nematic liquid crystal: dichroic dye).

Using such an optical element, a device was configured, in which the GH layer was in the vertically oriented state in the initial state (first state), that is, in the state in which no external voltage was applied, the linear light transmittance was 95%, and the blocking state (second state) with linear light transmittance of at most 5% could be realized, if a voltage having a frequency of about 60 Hz and an amplitude of about 11V was applied. The device was configured by overlapping two GH layers as produced above with each other, whereby in the initial state, both GH layers are in the vertically oriented state, so that it can be in a transmission state, and if it is in the second state, the GH layers are horizontally oriented for the optical axes to be perpendicular to each other, so that the blocking state can be constituted.

For the device, the critical voltage checked in the manner as described above was about 2V (alternating voltage at a frequency of 60 Hz) and the back-flow voltage was about 5V (alternating voltage at a frequency of 60 Hz).

Example 1

An alternating voltage having an amplitude of about 4V and a frequency of about 60 Hz as a medium voltage was applied to the device comprising the optical element as produced above for about 0.21 seconds before applying a second state voltage (an alternating voltage having an amplitude of about 11V and a frequency of about 60 Hz) for securing a second state, and then the second state voltage was applied thereto. FIG. 7 is a view summarizing the above process, and as shown in the drawing, it can be confirmed that the back-flow phenomenon is alleviated as compared with the case of FIG. 12 (Comparative Example 1).

Example 2

The optical element was driven in the same manner as in Example 1, except that the medium voltage was applied for about 0.28 seconds and then the second state voltage was applied. FIG. 8 is a view summarizing the above process, and as shown in the drawing, it can be confirmed that the back-flow phenomenon is alleviated as compared with the case of FIG. 12 (Comparative Example 1).

Example 3

The optical element was driven in the same manner as in Example 1, except that the medium voltage was applied for about 0.35 seconds and then the second state voltage was applied. FIG. 9 is a view summarizing the above process, and as shown in the drawing, it can be confirmed that the back-flow phenomenon is alleviated as compared with the case of FIG. 12 (Comparative Example 1).

Example 4

An alternating voltage having an amplitude of about 3V and a frequency of about 60 Hz as a medium voltage was applied to the device comprising the optical element as produced above for about 0.49 seconds before applying a second state voltage (an alternating voltage having an amplitude of about 11V and a frequency of about 60 Hz) for securing a second state, and then the second state voltage was applied thereto. FIG. 10 is a view summarizing the above process, and as shown in the drawing, it can be confirmed that the back-flow phenomenon is alleviated as compared with the case of FIG. 12 (Comparative Example 1).

Example 5

The optical element was driven in the same manner as in Example 4, except that the medium voltage was applied for about 0.9 seconds and then the second state voltage was applied. FIG. 11 is a view summarizing the above process, and as shown in the drawing, it can be confirmed that the back-flow phenomenon is alleviated as compared with the case of FIG. 12 (Comparative Example 1).

Comparative Example 1

The optical element was driven in the same manner as in Example 1 except that the second state voltage was immediately applied without the step of applying a medium voltage, and the results were described in FIG. 12.

Comparative Example 2

An alternating voltage having an amplitude of about 1.5V and a frequency of about 60 Hz as a medium voltage was applied to the device comprising the optical element as produced above for about 0.21 seconds before applying a second state voltage (an alternating voltage having an amplitude of about 11V and a frequency of about 60 Hz) for securing a second state, and then the second state voltage was applied thereto. FIG. 16 is a view summarizing the above process, and as shown in the drawing, it can be confirmed that in Comparative Example 2, the back-flow phenomenon is not alleviated as compared with the case of FIGS. 7 to 11 (Examples 1 to 5).

EXPLANATION OF REFERENCE NUMERALS

10: first active liquid crystal layer, 20: second active liquid crystal layer, 11: first electrode layer, 12: first vertical alignment layer, 13: first active liquid crystal layer, 14: second vertical alignment layer, 15: second electrode layer, 21: third electrode layer, 22: third vertical alignment layer; 23: second active liquid crystal layer, 24: fourth vertical alignment layer, 25: fourth electrode layer, 32: frame, 34: left eye lens and right eye lens

The invention claimed is:

1. A driving method of an optical element which comprises an active liquid crystal layer having an optical axis and including a liquid crystal compound, wherein the liquid crystal layer is configured to switch between a first state in which an orientation of the optical axis is in a vertically or horizontally oriented state and a second state in which the orientation of the optical axis is different from the first state, wherein a voltage of the first state is less than a voltage of the second state, the method comprising:
   in response to an instruction to control the liquid crystal layer to switch from the first state to the second state:
      controlling a power-supply device to apply a medium voltage that is greater than the voltage of the first state and less than the voltage of the second state, wherein the medium voltage is greater than or equal to a critical voltage and less than a back-flow voltage; and
      subsequently controlling the power-supply device to apply the voltage of the second state.

2. The driving method according to claim 1, wherein the liquid crystal layer further comprises a dichroic dye guest.

3. The driving method according to claim 1, wherein the liquid crystal layer has a thickness of 4 μm or more.

4. The driving method according to claim 1, wherein the applied medium voltage is an alternating voltage.

5. The driving method according to claim 4, wherein the alternating voltage has a frequency in a range of 40 Hz to 1 kHz.

6. The driving method according to claim 1, wherein the voltage of the first state is greater than zero and less than double the critical voltage.

7. The driving method according to claim 1, wherein the critical voltage is between 0.05 times to 0.2 times the voltage of the second state.

8. The driving method according to claim 1, wherein the critical voltage is in a range of 0.5V to 3V.

9. The driving method according to claim 1, wherein the back-flow voltage is between 0.3 times to 0.7 times the voltage of the second state.

10. The driving method according to claim 1, wherein the medium voltage is between 0.15 times to 0.5 times the voltage of the second state.

11. The driving method according to claim 1, wherein the voltage of the second state is in a range of 10V to 30V.

12. The driving method according to claim 1, wherein controlling the power-supply device to apply the medium voltage is performed for a holding time before controlling the power-supply device to apply the voltage of the second state, wherein the holding time is between 0.3 times to 1.2 times a duration of time required for occurrence of 90% transmittance fluctuation when the medium voltage is applied at the critical voltage.

13. The driving method according to claim 1, wherein controlling the power-supply device to apply the medium voltage is performed for 0.1 seconds to 10 seconds before controlling the power-supply device to apply the voltage of the second state.

14. An optical element comprising:
   an active liquid crystal layer having an optical axis and including a liquid crystal compound, wherein the liquid crystal layer is configured to switch between a first state in which an orientation of the optical axis is in a vertically or horizontally oriented state and a second state in which the orientation of the optical axis is different from the first state; and
   a power-supply device configured to, in response to an instruction to control the liquid crystal layer to switch from the first state to the second state:
   apply a medium voltage to the liquid crystal layer, wherein the medium voltage is greater than the voltage of the first state and less than the voltage of the second state, and wherein the medium voltage is greater than or equal to a critical voltage and less than a back-flow voltage; and
   subsequently apply the voltage of the second state.

15. A transmittance-variable device comprising:
   the optical element of claim 14; and
   a second active liquid crystal layer or a passive polarizing layer disposed so as to overlap with the active liquid crystal layer included in the optical element.

16. Eyewear comprising a left eye lens and a right eye lens, and a frame for supporting the left eye lens and the right eye lens,
   wherein each of the left eye lens and the right eye lens comprises the optical element of claim 14.

17. The eyewear according to claim 16, wherein the eyewear is an augmented reality experience device.

* * * * *